Jan. 30, 1968  MASAAKI KOBAYASHI ET AL  3,366,879
METHOD FOR MEASURING THE SPECIFIC RESISTANCE OF A SILICON
CRYSTAL BY MEASURING THE BREAKDOWN VOLTAGE
Filed Oct. 16, 1964  2 Sheets-Sheet 1

United States Patent Office 3,366,879
Patented Jan. 30, 1968

3,366,879
METHOD FOR MEASURING THE SPECIFIC RESISTANCE OF A SILICON CRYSTAL BY MEASURING THE BREAKDOWN VOLTAGE
Masaaki Kobayashi, Tokyo, and Kiyoyuki Tsurumiya, Kawasaki, Japan, assignors to Fujitsu Limited, Kawasaki, Japan, a corporation of Japan
Filed Oct. 16, 1964, Ser. No. 404,456
Claims priority, application Japan, Oct. 17, 1963, 38/55,553
3 Claims. (Cl. 324—158)

ABSTRACT OF THE DISCLOSURE

The specific resistance of a silicon crystal is determined by measuring the breakdown voltage of such crystal when operated as part of a point contact diode.

Our invention relates to a method of measuring the specific resistance of a silicon crystal. More particularly, the invention relates to a method of measuring the specific resistance of a single crystal of silicon semiconductor material.

The principal object of the invention is to provide a new and improved method of measuring the specific resistance of a silicon crystal.

An object of the invention is to provide a method of measuring the specific resistance of a silicon crystal with accuracy and reliability.

Another object of the invention is to provide a method of measuring the specific resistance of a silicon crystal which is simple and undertaken with facility.

In accordance with the method of our invention, the specific resistance of a silicon crystal is determined by measuring the breakdown voltage of a point-contact silicon diode.

In order that the invention may be readily carried into effect, it will now be described with reference to the accompanying drawing, wherein.

Figure 1:
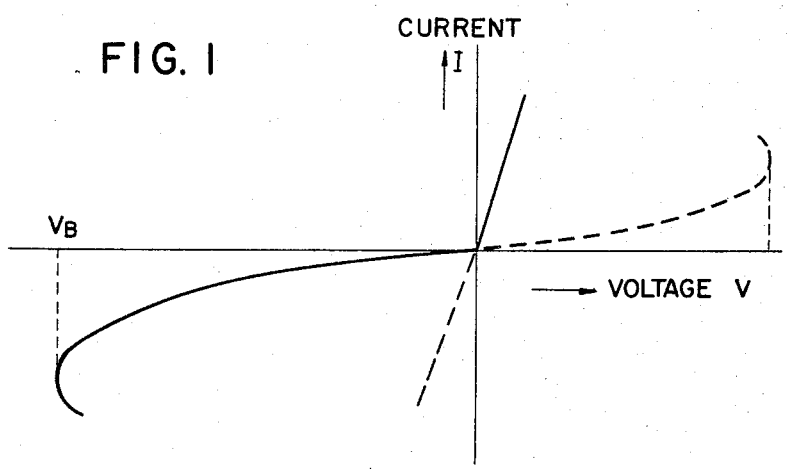
FIG. 1 is a graphical presentation of the current-voltage characteristic of a silicon to silicon point-contact silicon diode.

FIG. 1 indicates the current-voltage characteristic of a silicon to silicon point-contact silicon diode. The silicon diode comprises a silicon crystal body of one conductivity type which is contacted by a silicon crystal of the opposite conductivity type having the configuration of a needle. The point of the needle contacts the body in a suitable known manner.

In FIG. 1, the current is indicated by the ordinate and the voltage is indicated by the abscissa. The breakdown voltage $V_B$ is a critical negative voltage. The breakdown voltage $V_B$ is thus attained by a reverse bias on the point-contact silcon diode. The breakdown voltage $V_B$ of the point-contact silicon diode is closely related to the specific resistance of said diode.

When the specific resistance of each side of the silicon crystal body of the diode is equal to that of the other, the breakdown voltage $V_B$ depends upon the specific resistance of both sides. When the specific resistance of one side of the silicon crystal body of the diode is considerably different from that of the other side, the breakdown voltage depends only upon the specific resistance of the side having the lower level of impurity density.

Thus, when a silicon crystal of very low specific resistance and known or determined conductivity type contacts a silicon crystal of the opposite conductivty type and an unknown, although higher, specific resistance, the unknown specific resistance may be determined by measuring the breakdown voltage of the contact and by determining the specific resistance from the breakdown voltage-specific resistance characteristic.

Figure 2:
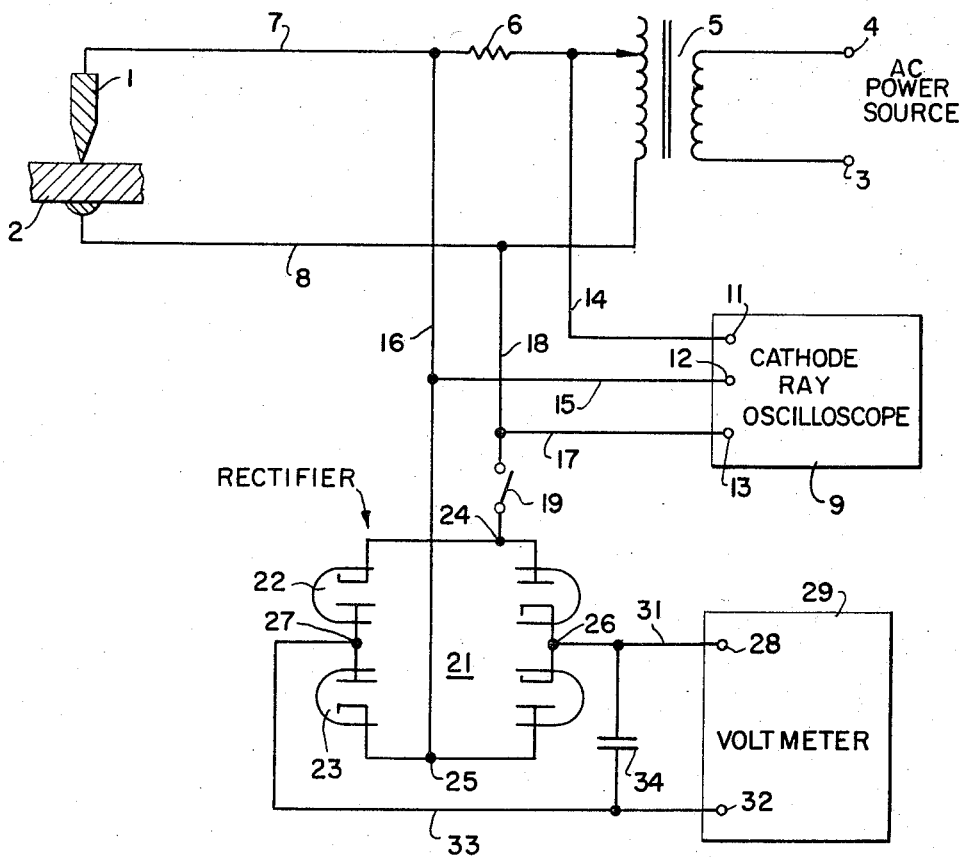
FIG. 2 is a circuit diagram of an embodiment of a circuit for measuring the breakdown voltage of a silicon to silicon point-contact silicon diode.

FIG. 2 is an embodiment of a circuit for measuring the breakdown voltage of a point-contact silicon diode. In FIG. 2, a silicon crystal 1 has the configuration of a needle, the point of which contacts a silicon crystal body 2. The crystal 1 is of opposite conductivity type from the crystal 2 and these crystals from together a point-contact silicon diode.

The needle crystal 1 contacts the crystal body 2. The contacting surfaces of the crystals 1 and 2 are kept clean by any suitable method such as, for example, chemical polishing to eliminate irregular or damaged surfaces. The point of the needle crystal 1 contacts the crystal body 2 at substantially right angles. The breakdown voltage is affected to a slight extent by the contact pressure and the contact area of the crystals 1 and 2, so that it is desirable to maintain constant values of contact pressure and a constant contact area between the crystals in determining the specific resistances.

In point-contact diodes of known type wherein a metal needle is utilized in place of the needle crystal 1, the specific resistance of the body crystal 2 may be determined by measuring the breakdown voltage. However, the accuracy and reliability of the measurement of the breakdown voltage is poor in comparison with such measurement of an all crystal diode of the type utilized in FIG. 2.

In FIG. 2, an AC voltage is applied to the point-contact diode 1, 2 from a source of AC power via power supply input terminals 3 and 4, a transformer 5, a resistor 6 and leads 7 and 8. When the specific resistance is very large, it is desirable to apply a pulsed voltage to the diode 1, 2 because a DC or sinusoidal AC voltage may produce inaccuracies in the breakdown voltage due to heating effect.

A cathode ray oscilloscope 9 having input terminals 11, 12 and 13 is connected to the leads 7 and 8 in a manner whereby said oscilloscope indicates the current and voltage applied to the diode 1, 2. Thus, the current terminal 11 of the oscilloscope 9 is connected to the lead 7 between the resistor 6 and the transformer 5 by a lead 14. The current terminal 12 of the oscilloscope 9 is connected to the lead 7 between the resistor 6 and the needle crystal 1 of the diode 1, 2 by leads 15 and 16. The voltage terminal 12 is the same as the current terminal 12 and is connected to the same point of the lead 7 by the same leads 15 and 16. The voltage terminal 13 of the oscilloscope 9 is connected to the lead 8 between the crystal body 2 of the diode 1, 2 and the transformer 5 by leads 17 and 18.

A switch 19 is connected in the lead 18 between the lead 8 and a rectifier 21. The rectifier 21 comprises rectifier tubes 22 and 23, an input terminal 24 connected to the lead 8 by the lead 18 via the switch 19, an input terminal 25 connected to the lead 7 by the lead 16, an output terminal 26 and an output terminal 27. Double rectifier tubes 22 and 23 are utilized to enable the testing of n-type and p-type crystals, each of which produces a breakdown voltage having a polarity opposite that of the other.

The output terminal 26 of the rectifier 21 is connected to an input terminal 28 of a voltmeter 29 by a lead 31. The output terminal 27 of the rectifier 21 is connected to an input terminal 32 of the voltmeter 29 by a lead 33. A capacitor 34 is connected across the rectifier 21 and across the voltmeter 29 between the leads 31 and 33.

When the diode 1, 2 is biased by the voltage from the source via the terminals 3 and 4, the switch 19 is open. Thus, the oscilloscope 9 indicates the voltages to the diode 1, 2, but the voltmeter 29 indicates nothing because it is not connected in the circuit. When the oscilloscope 9 indicates a maximum voltage magnitude, which is the breakdown voltage, the switch 19 is closed. When the switch 19 is closed by the operator, the rectifier 21, capacitor 34 and voltmeter 29 are connected into the circuit.

When the rectifier 21 is connected into the circuit, the breakdown voltage, which is the voltage then applied to the diode 1, 2, is rectified and the voltage derived at the rectifier output terminals 26 and 27 charges the capacitor 34 to the maximum value of the voltage which is indicated by the voltmeter 29. The voltmeter 29 thus indicates the magnitude of the critical breakdown voltage $V_B$.

Figure 3:
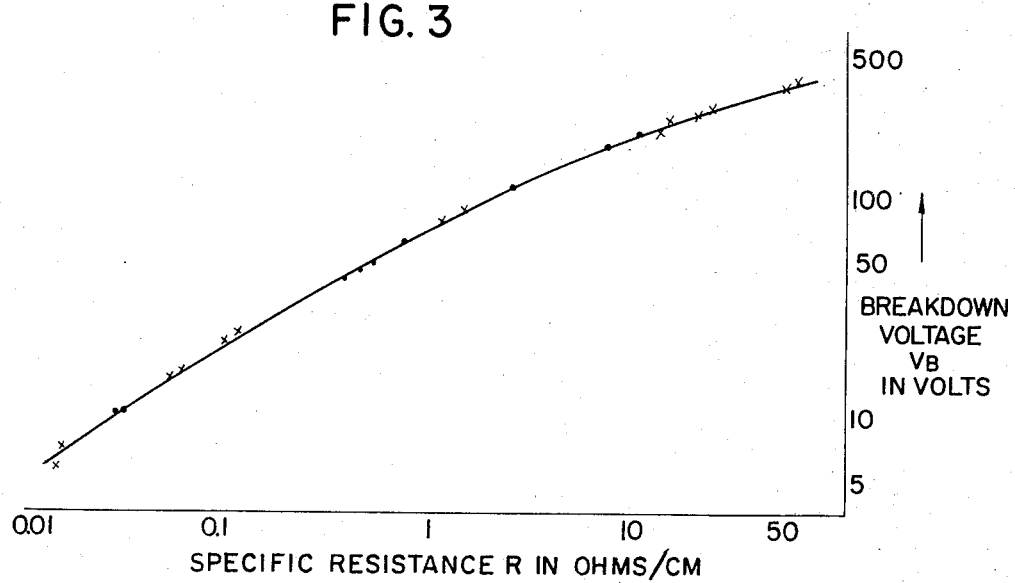
FIG. 3 is a graphical presentation of the breakdown voltage-specific resistance characteristic of silicon.

FIG. 3 illustrates the relationship of the breakdown voltage $V_B$ of the diode 1, 2 and the specific resistance R of said diode for n-type silicon. The graph of FIG. 3 was obtained by utilizing a point-contact diode provided by cutting a p-type silicon crystal having a special resistance of 0.0005 ohm per cm. to dimensions of 1.0 by 1.0 by 10.0 mm. and by sharpening one end to a needle by chemical etching. The surface of the crystal body of the point-contact diode utilized to obtain the graph of FIG. 3 was finished by a mixed fluid of nitric acid and fluoric acid. A sinusoidal voltage having a frequency of 50 cycles per second was used as the biasing voltage.

Figure 4:
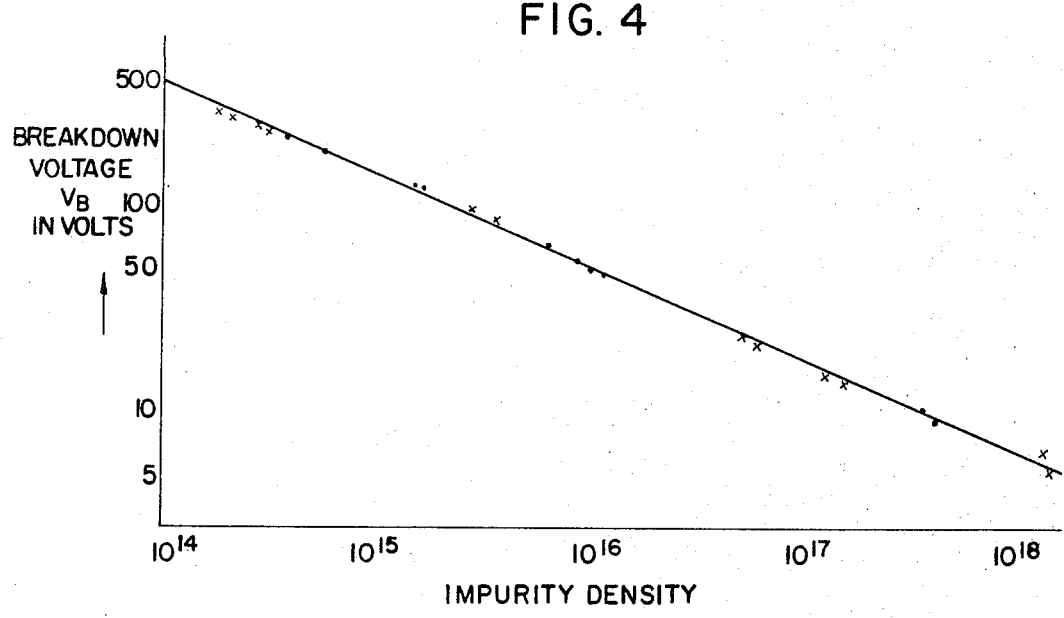
FIG. 4 is a graphical presentation of the breakdown voltage-impurity density characteristic of silicon.

FIG. 4 is a graph in logarithmic scale, of breaking down voltage-impurity density, from which may be derived the impurity density or the corresponding specific resistance. The abscissa is the impurity density or donor density, which may be derived from the graph of FIG. 3, and the ordinate is the breakdown voltage.

When the specific resistance of p-type silicon was to be measured, a silicon needle of n-conductivity type having a specific resistance of 0.0007 ohm per cm. was utilized The method of the present invention enables the measurement by simple means of the specific resistance o a very small specimen which would be very difficult o impossible to measure by the four probe method. Accordingly, the method of the present invention may be utilized to measure the specific resistance or impurity density of a specimen comprising a tiny pellet of an epitaxially grown layer for a semiconductor device. The method of the present invention may also be utilized to determine the variation of specific resistance of a semiconductor device in operation and due to heat treatment and impurity diffusion.

While the invention has been described by means of specific examples and in a specific embodiment, we do not wish to be limited thereto, for obvious modifications will occur to those skilled in the art without departing from the spirit and scope of the invention.

We claim:
1. A method for measuring the specific resistance of a silicon crystal of determined conductivity type, comprising the steps of
    applying to said crystal a point contact silicon probe of low specific resistance relative to the specific resistance of said crystal and of opposite conductivity type to provide a silicon to silicon point conduct diode;
    energizing the junction of the crystal and the point contact silicon probe into the breakdown region; and
    measuring the breakdown voltage to determine the specific resistance of said crystal.
2. A method as claimed in claim 1, wherein said point contact silicon probe has a needle point in contact with said crystal.
3. A method as claimed in claim 1, wherein the specific resistance of said point contact silicon probe is very low relative to that of said crystal.

References Cited

UNITED STATES PATENTS 3,265,944   8/1966   Wentorf _____ 317—236

FOREIGN PATENTS 1,079,196   7/1960   Germany.

OTHER REFERENCES

G. E. Transistor Manual (6th edition), March 1962, pages 223, 224.

RUDOLPH V. ROLINEC, *Primary Examiner.*

E. L. STOLARUN, *Assistant Examiner.*